United States Patent [19]

Kosugi

[11] Patent Number: 5,053,670
[45] Date of Patent: Oct. 1, 1991

[54] PRECISION ACTUATOR

[75] Inventor: Masao Kosugi, Yokohama, Japan

[73] Assignee: Canon Kabushiki Kaisha, Tokyo, Japan

[21] Appl. No.: 616,063

[22] Filed: Nov. 20, 1990

[30] Foreign Application Priority Data

Nov. 20, 1989 [JP] Japan .................................. 1-299580
Nov. 20, 1989 [JP] Japan .................................. 1-299581
Nov. 20, 1989 [JP] Japan .................................. 1-299581

[51] Int. Cl.$^5$ ............................................. H01L 41/08
[52] U.S. Cl. ..................................... 310/328; 310/323; 310/83
[58] Field of Search .................... 310/323, 328, 80, 83

[56] References Cited

U.S. PATENT DOCUMENTS

| 4,723,086 | 2/1988 | Leibovich et al. ................. | 310/328 |
| 4,734,610 | 3/1988 | Okumura et al. ................ | 310/328 X |
| 4,793,689 | 12/1988 | Aoyagi et al. ................... | 310/323 X |
| 4,893,047 | 1/1990 | Honda ............................... | 310/323 |
| 4,935,659 | 6/1990 | Naka et al. ......................... | 310/328 |

FOREIGN PATENT DOCUMENTS 0247768 10/1987 Japan ................................. 310/323

Primary Examiner—Mark O. Budd
Attorney, Agent, or Firm—Fitzpatrick, Cella, Harper & Scinto

[57] ABSTRACT

A precision actuator includes a housing; an ultrasonic motor disposed in the housing and having a ring-like rotor and a stator; an output shaft; a rotation-restraint rectilinear motion guide for coupling the output shaft to the housing, slidably in an axial direction but unrotatably relative to it; and a screw mechanism for coupling the output shaft to the rotor.

14 Claims, 4 Drawing Sheets

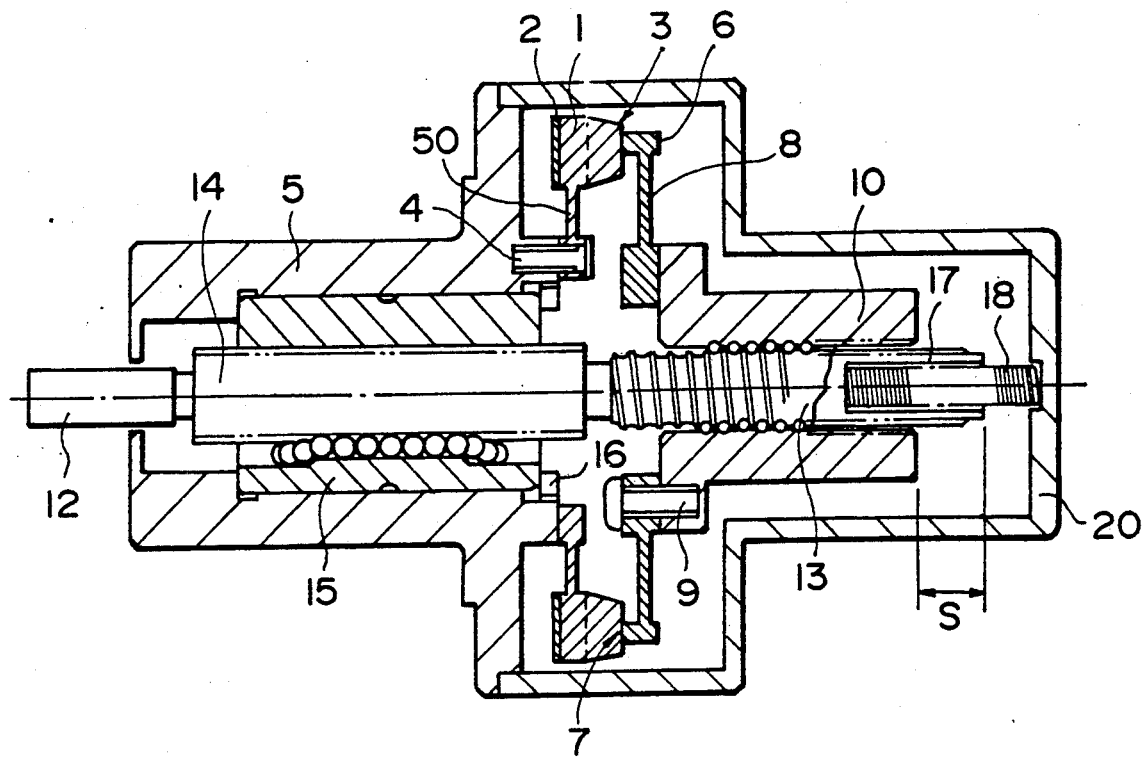
F I G. 1
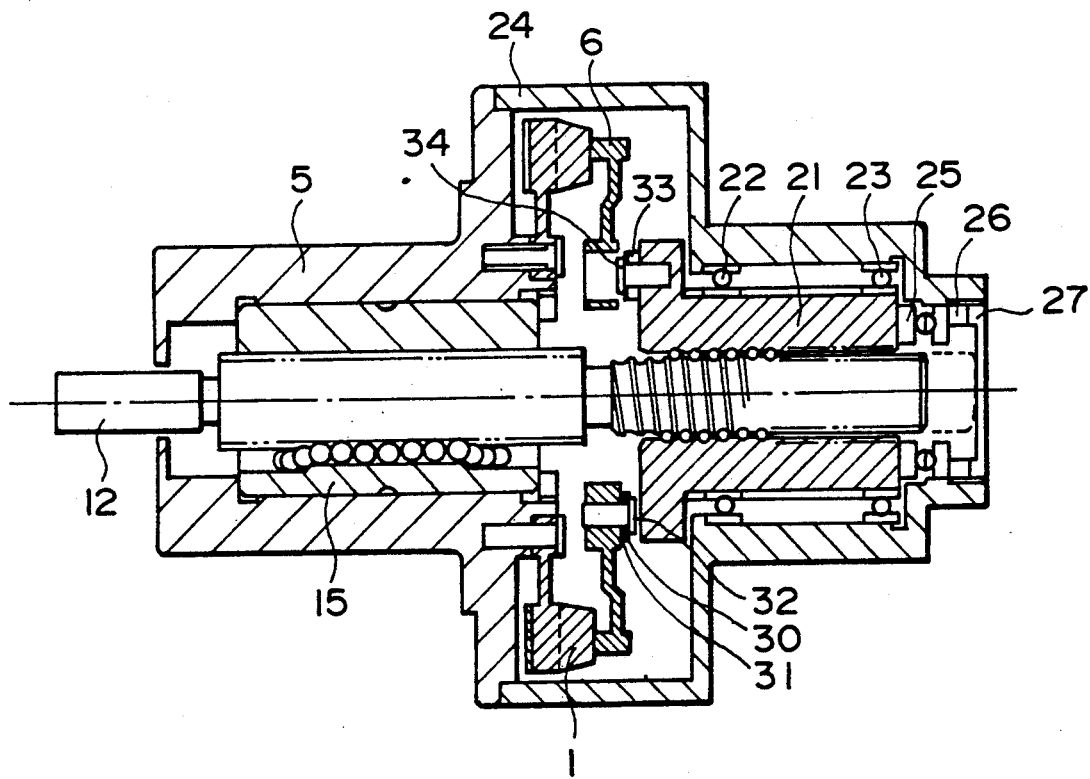
F I G. 2

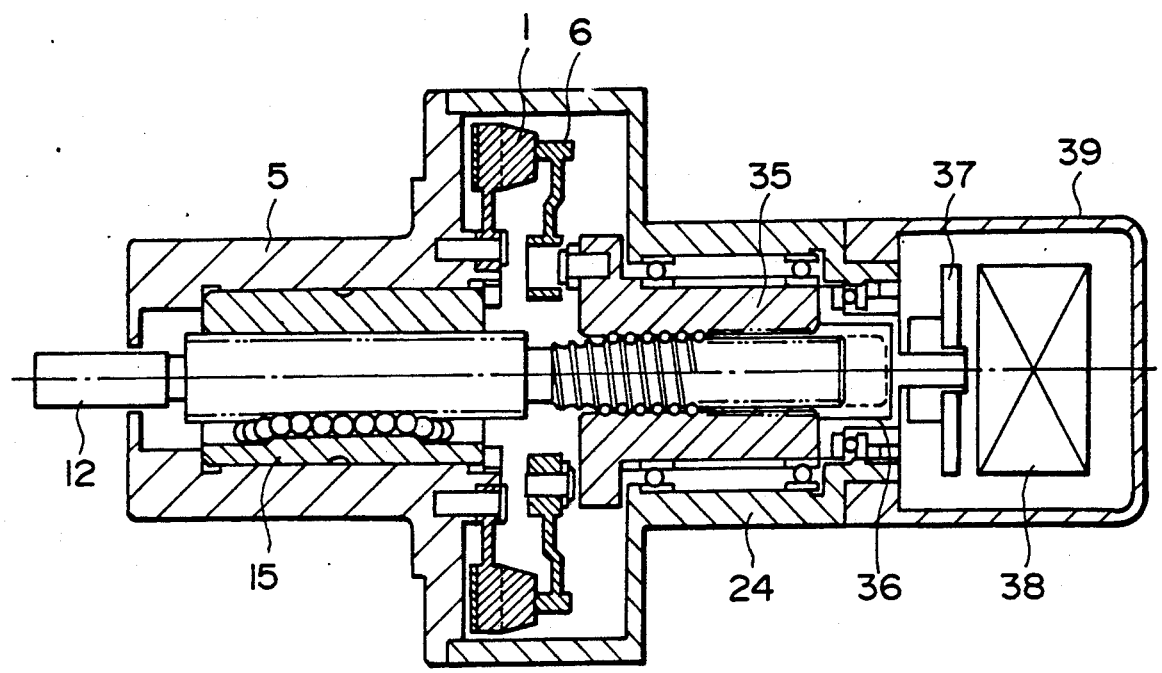
F I G. 3
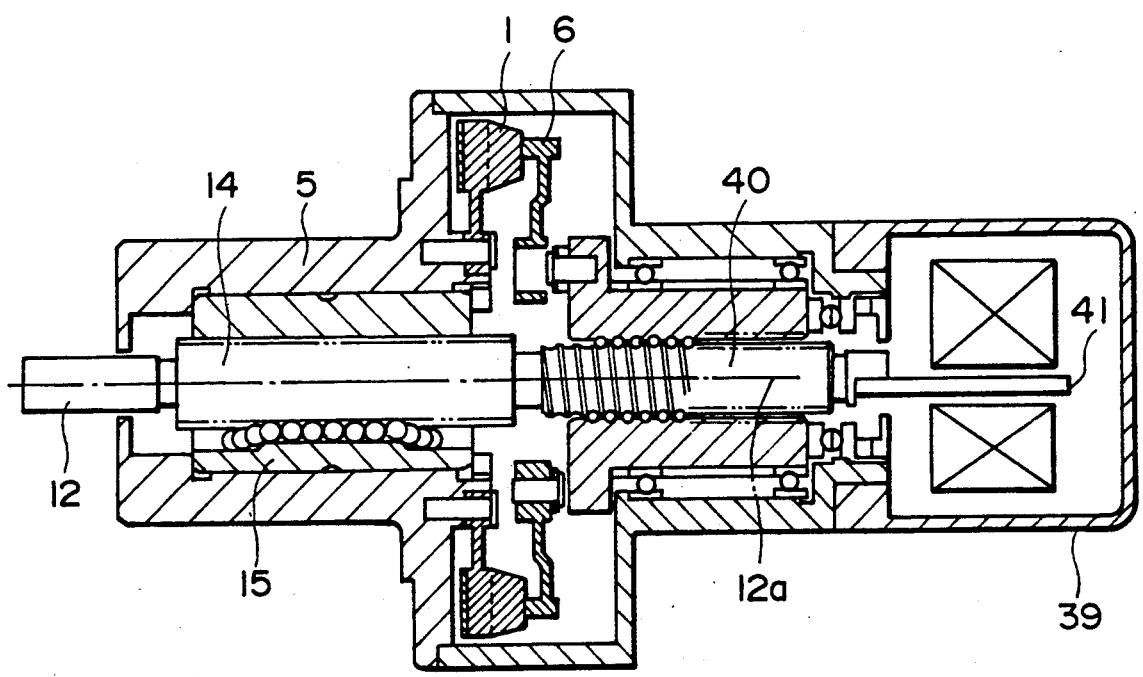
F I G. 4

PRECISION ACTUATOR

FIELD OF THE INVENTION AND RELATED ART

This invention relates to an actuator to be used in a precision instrument or the like. More particularly, the invention is concerned with a precision actuator having a performance of high-resolution rectilinear motion and/or rotary motion.

There are many types of actuators such as electric actuators, pneumatic actuators, hydraulic actuators and the like. Among them, the number of rectilinear motion actuators is not large. Of the rotary-motion and rectilinear-motion actuators, only a limited number of actuators have a large dynamic range and a high resolution in respect to the positioning accuracy. If the compactness also is to be considered, no actuator can satisfy the requirements sufficiently.

For example, while linear motors are the very small number of actuators that satisfy the conditions, they are deficient in compactness. An actuator which is called an "inchworm", comprising combined piezoelectric devices, satisfy the two basic requirements. However, it is deficient in rigidity and reliability. Also, it is very expensive. While piezoelectric devices have a fine positioning accuracy, the stroke is very short such as of an order of several tens microns.

An actuator to be used in a precision instrument should have a large movable range (stroke) and a high resolution, and the resolution-to-stroke ratio should be not less than 1:1000. Further, it should be compact and inexpensive.

Conventionally, where high-resolution feeding and positioning is to be made in a large movable range, a motor such as a step motor is selected as a drive source and a rotation to rectilinear-motion converting mechanism is used in combination with a reduction mechanism.

SUMMARY OF THE INVENTION

It is accordingly a primary object of the present invention to provide an improved component type actuator which has a high positioning accuracy not larger than 1 micron and a large stroke not smaller than 1 mm, and which is compact and inexpensive.

It is another object of the present invention to provide an improved component type actuator which has a high positioning accuracy of micron order and a large rectilinear motion stroke of millimeter order and, additionally, which is arranged to set a movable range up to 360 degrees at a high angular positioning accuracy not more than 30 sec. and which is compact and inexpensive.

It is a further object of the present invention to provide an improved component type actuator having a feed-amount self-detecting function.

It is yet another object of the present invention to provide an improved built-in type actuator which can be directly built in an instrument.

In accordance with an aspect of the present invention, to achieve at least one of these objects, one or a plurality of ultrasonic (wave) motors are used. While an ultrasonic motor itself is known in the art and thus details thereof are not explained here, basically it comprises a comb-like ring stator 50 and a ring rotor 51 (FIG. 6) as major components. When a voltage having an AC component is applied to a piezoelectric ceramics 52 adhered to the bottom of the stator 50, waves are produced at the comb-like surface of the stator 50 by which the rotor 51 is rotated.

Generally, the ultrasonic motor has features such as follows: The first feature is low speed and high torque. The second feature is that, since in principle it uses a friction drive, a high self-holding torque is obtainable in the stop period (non-energization period). The third feature is that, since the drive portion has a ring-like shape, the space about the central axis of rotation can be used effectively.

However, what is the most important feature of the ultrasonic motor, while it may not be known widely, is the rotary positioning accuracy. This will be explained briefly. FIG. 7 illustrates the applied frequency versus angular speed characteristic of an ultrasonic motor. For the control of the angular speed of the ultrasonic motor in a different way, there is a control method based on applied voltage and a control method based on phase changing. For the positioning control, the control method based on the applied frequency is preferable. In this occasion, to start the motor, first a high frequency (a voltage frequency about 41.5 KHz in FIG. 7) is applied. In response, the motor starts low-speed rotation. After this, as the frequency is decreased gradually, the low-speed rotation transits to high-speed rotation. At the frequency of 39 KHz, the maximum speed (about 100 rpm) is attained. To stop the motor, on the other hand, the frequency is increased gradually and, if the positioning is aimed at, the lowest-speed state (about 41 KHz) is established just before the target position (destination). When the target position is reached or at the moment just before it, the input is disconnected. In this manner, the positioning can be done. Since the ultrasonic motor is based on the friction drive, the acceleration at the rise and the fall is large, and this is one major advantage of the ultrasonic motor. Additionally, by intercepting the applied voltage during the low-speed rotation period, the motor is stopped substantially instantaneously. The quantity of overrunning at this time is very small and, since the quantity of overrunning is substantially constant if the angular speed at the low-speed period is maintained constant, high-positioning accuracy is attainable.

As regards the positioning performance of such a ultrasonic motor, where the motor has an stator diameter of about 80 mm, for example, it is possible to attain a positioning accuracy not more than 1/85,000 resolution, or not more than about 15 sec., in terms of angle.

As regards the mechanism for converting the rotation of the ultrasonic motor into rectilinear motion, reasonably it may be based on "taper feed" and, in this case, practically it may be appropriate to use a combination of a screw and a nut. In this combination, if one is held stationary, the other is moved axially while being rotated. Thus, if one is held rotatably with its axial movement being prohibited and if, to the contrary, the other is held movably in the axial direction while being constrained in respect to the rotational direction, then the rotation of the former causes axial movement of the latter.

Further, if the inside space of the rotor or stator is used effectively as described with reference to the second feature of the ultrasonic motor, such converting mechanism can be set in the inside space, and this makes it possible to provide a compact actuator.

These and other objects, features and advantages of the present invention will become more apparent upon consideration of the following description of the preferred embodiments of the present invention taken in conjunction with the accompanying drawings.

BRIEF DESCRIPTION OF THE DRAWINGS

FIG. 1 is a sectional view, illustrating the structure of a basic form of the present invention.

FIG. 2 is a sectional view, illustrating the structure of an embodiment of the present invention.

FIG. 3 is a sectional view, illustrating the structure of another embodiment of the present invention wherein a rotational position detector is added.

FIG. 4 is a sectional view, illustrating the structure of a further embodiment of the present invention wherein an axial position detector is added.

DESCRIPTION OF THE PREFERRED EMBODIMENTS

Figure 5:
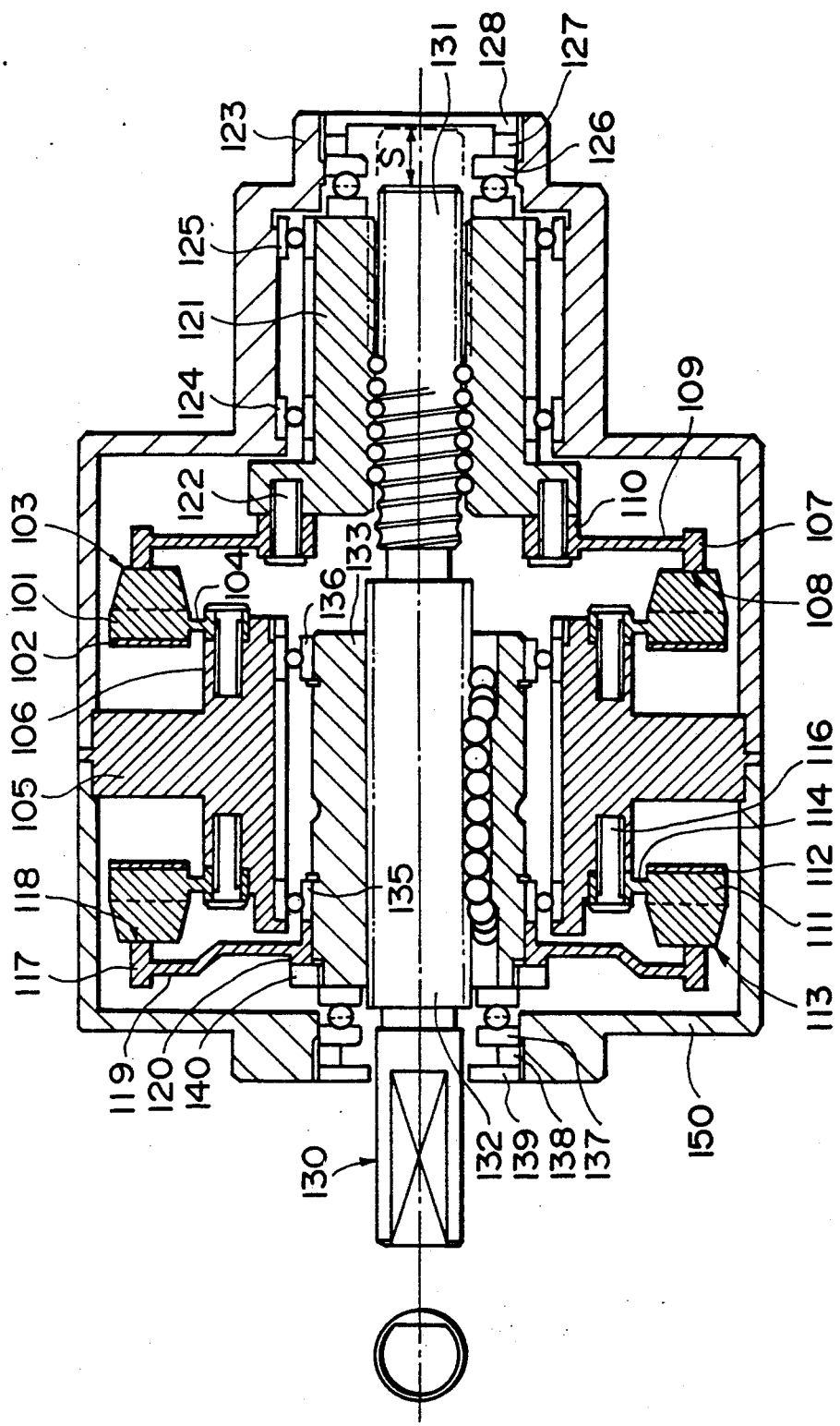
FIG. 5 is a sectional view, illustrating the structure of yet another embodiment of the present invention.
Figure 6:
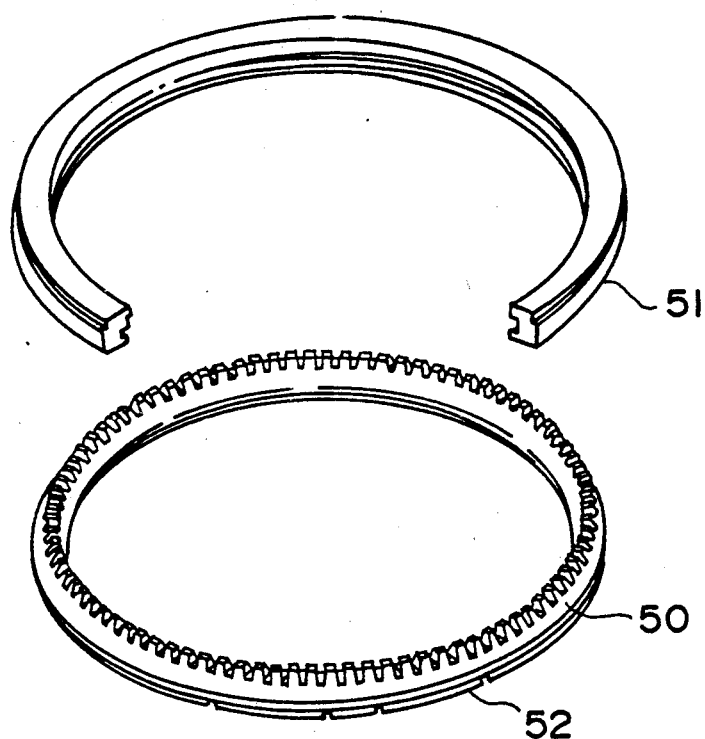
FIG. 6 is a perspective view, illustrating details of a drive portion of an ultrasonic motor.

FIG. 1 illustrates the basic form of the present invention wherein reference numeral 1 denotes a stator of an ultrasonic motor. Piezoelectric ceramics 2 is adhered to the back of the stator. By applying a voltage having a certain frequency to the piezoelectric ceramics, oscillatory waves are produced at the surface 3 of the stator 1. The stator 1 is securely fixed to a first housing 5 by means of bolts 4. The stator 1 has a thin plate-like portion 50 between the oscillating portion (surface 3 side) and the stationary portion (bolt 4 side) thereof. The thin plate-like portion serves as a spring repulsive to the frictional pressing force and functions also as a damper for preventing the oscillation at the oscillating portion from being blocked by the stationary portion.

Rotor 6 has a friction surface 7 which is contacted to the oscillation surface 3 of the stator 1, and the rotor 6 rotates as it receives the progressive waves from the stator 1. The rotor 6 is fixed to a female ball thread (nut) 10, at the right-hand side of the rotor 6 in FIG. 1, by means of bolts 9. Similarly, the rotor 6 has a thin plate-like portion 8 between the friction surface 7 and the stationary portion (bolt 9 side) thereof, and the thin plate-like portion has a spring characteristic of some degree. Output shaft 12 extends through the inside of the stator 1 as well as the inside of the rotor 6. The output shaft 12 is placed coaxially with the rotational axis of the rotor 6. A portion of the output shaft 12 provides a male screw thread portion (screw) 13 of the ball thread, which engages with the female ball thread 10. On the other hand, another part of the output shaft 12 provides a rotation-restraint rectilinear motion guide, more particularly, a shaft side portion (spline shaft) 14 of a ball spline, which engages with a female bearing (boss member) 15 of the ball spline to form a rectilinear motion guide. The female bearing 15 of the ball spline is placed on the left-hand side of the stator 1, in FIG. 1. The female bearing 15 of the ball spline is inserted into the first housing 5 and is held fixed by means of a keeper ring 16. Bore 17 is formed in one end portion (ball thread side) of the output shaft 12, and a coiled spring 18 is inserted into this bore. An end of the coiled spring 18 is supported by a second housing 20, and the other end of the spring is contacted to the bottom of the bore 17. Thus the spring serves to urge the output shaft so that it is separated away from the housing 20. The other end portion of the output shaft 12 at the rectilinear motion guide side is a protruded outwardly of the first housing 5 and is coupled to an unshown member which is to be driven. The force of the coiled spring 18 serves to press the rotor 6 against the stator 1, through the shaft 12 and the female ball thread 10.

The second housing 20 is securely fixed to the first housing 5, such that they cooperate with each other to define a substantially closed inside space, isolated from the outside. In this example, all the mechanisms described above are accommodated in this inside space. Therefore, even if the contact between the oscillation surface 3 and the friction surface 7 produces foreign particles, it is possible to prevent the foreign particles from being scattered outwardly.

This is the basic structure of the present embodiment. When the ultrasonic motor operates, the nut 10 side of the ball thread rotates while, on the other hand, the shaft 12 side moves axially because the rotation thereof is constrained. Here, if the ultrasonic motor has a positioning angular resolution of 15 sec. as described and the ball thread has a lead of 2 mm, then in regard to the axial feeding a very high positioning resolution of 0.023 micron (0.011 micron if the lead is 1 mm) is attainable.

In FIG. 1, the stroke of the output shaft 12 is ±s and, in practical dimension, s=5 mm is set. However, it will be readily understood that a longer stroke or a shorter stroke can be set as desired by appropriately setting the position of each of the female ball spline 15 and the female ball thread 10 as well as the length and position of each of the spline shaft portion 14 and the ball thread shaft portion 13 of the output shaft 12.

Illustrated in FIG. 1 is a basic form with which the explanation can be facilitated. If, for example, the axial force applied to the output shaft 12 changes, there is a possibility that the friction force between the stator 1 and the rotor 6 of the ultrasonic motor changes. Desirably, in practice, such a change should be compensated.

FIG. 2 illustrates a practical embodiment according to the present invention. The output shaft 12, the ultrasonic motor (stator 1 and rotor 6), the linear guide 15 and the first housing 5 have the same structures as of those shown in FIG. 1, and description of these components is omitted here by assigning the same reference numerals to them. One major improvement resides in the guide for the nut 21 of the ball thread and the pressing spring means. More specifically, a second housing 24 supports the nut 21 of the ball thread with respect to the rotational direction by using rotational bearings 22 and 23, and also supports the same with respect to the axial direction by using a thrust bearing 25, a keeper ring 24 and a double nut 27. The rotor 6 and the nut 21 of the ball thread are coupled to each other, with a ring-like leaf spring 30 intervening therebetween. More particularly, a portion of the ring-like leaf spring 30 is fixed to the rotor 6 by means of a bolt 32, with the intervention of a spacer 31 while, on the other hand, at the opposite portion, the ring-like leaf spring 30 is fixed to the nut 21 by another bolt 34, with the intervention of another spacer 33. With this arrangement, the nut 21 can apply an axial urging pressure to the rotor 6. The urging pressure is adjustable by rotationally adjusting the keeper ring 24 to adjust the position of the thrust bearing 25.

Since in the FIG. 2 embodiment the shaft 12 and the nut 21 are positively guided, relative to the housings 5 and 24, even if an external force of some degree is applied to the output shaft, it is possible to retain the specified performance.

In the examples of FIGS. 1 and 2, the actuator itself is not equipped with a function for detecting the position of the output shaft 12. Therefore, if the positioning or constant-feed is to be done, it is necessary to provide a position detecting sensor on the member to be driven, for example, to execute feedback control based on the sensor output.

FIG. 3 illustrates an embodiment which is equipped with the position detecting function. The drive portion and the guide portion have the same structures as of the FIG. 2 embodiment, and description of them is omitted here. As for the detecting means in this example, use of a laser rotary encoder device (hereinafter "LRE device") having a high angular resolution, is preferable. Since such an LRE device is known as disclosed in Japanese Laid-Open Patent Application, Laid-Open No. Sho 61-65166, for example, description thereof is omitted here. In FIG. 3, a coupling 36 is fixed at an end to a female ball thread 35 and is fixed at another end to an optical scale 37. The optical scale has a glass disk on which radial fine gratings are engraved. Disposed opposite to the optical scale is a detecting means 38 which serves to detect the quantity of rotation of the optical scale, to convert the detected quantity into an electric signal and to output the same. The detecting means 38 includes a semiconductor laser, an interference optical system, a photoreceptor and the like. The LRE device as a whole is protected by a third housing 39 which is secured to the second housing 24. With the above-described additional function, it is possible to detect the rotational angle of the female ball thread 35, and the detected rotational angle can be converted into the amount of axial movement on the basis of the lead of the ball thread. As a result, the closed loop position servo control is attainable.

FIG. 4 illustrates another embodiment which is equipped with the position detecting function. Similarly, the drive portion and the guide portion have the same structures as of the FIG. 2 embodiment, and description of them is omitted here. In this example, as the detecting means, a laser linear encoder device (hereinafter "LLE device") is used. Optical scale 41 is directly secured by adhesion to an output shaft (screw) 40. In this example, it is desirable that the grating face of the optical scale is aligned with the central axis 12a of the output shaft, for precluding Abbe's errors.

FIG. 5 illustrates the structure of a further embodiment of the present invention. In this example, two sets of ultrasonic motors having substantially the same configuration and specification are incorporated. One located at the left side of the drawing will be referred to as a "left-side ultrasonic motor", and one located at the middle will be referred to as a "right-side ultrasonic motor", and they will be explained together. Denoted at 101 (111) is a stator of the ultrasonic motor, and a piezoelectric ceramics 102 (112) is adhered to the back of the stator. By applying a voltage having a certain frequency to the piezoelectric ceramics, oscillatory waves are produced at the stator surface 103 (113). The stator is securely fixed to a stationary ring 105 by means of bolts 106 (116). The stator 101 (111) has a thin plate-like portion 104 (114) between its oscillating portion and its stationary portion. The thin plate-like portion serves as a spring repulsive to the friction pressing force and also functions like an isolator to prevent the oscillation at the oscillating portion from being blocked by the stationary portion.

On the other hand, a rotor 107 (117) has a friction surface 108 (118) which is pressed against the oscillation surface 103 (113) of the stator 101 (111). The rotor rotates as it receives progressive waves from the stator 101 (111). Similarly, the rotor 107 (117) has a thin plate-like portion 109 (119) between the friction surface 108 (118) and its inside flange 110 (120), and this thin plate-like portion is so structured to provide a suitable spring constant. This serves to set a proper bearing pressure between the rotor 107 (117) and the stator 101 (111) as the inside flange portion 110 (120) is pressed.

The movable portion of the right-side ultrasonic motor, namely, the rotor 107 and the nut 121 of the ball thread are coupled to each other by bolts 122. First housing 123 supports the nut 121 of the ball thread with respect to the rotational direction by using rotational bearings 124 and 125, and also it supports the nut 121 with respect to the axial direction by using a thrust bearing 126, a keeper ring 127 and a double nut 128. The stationary ring 105 is securely fixed to the first housing 123. By rotating the keeper ring 127 to adjust the position of the nut 121 of the ball thread suitably, under the influence of the thin plate-like portion 109 of the rotor 107 a suitable urging pressure can be applied to between the friction surface 108 of the rotor 107 and the oscillation surface 103 of the stator 101.

A portion of the output shaft 130 provides a male screw thread portion (screw) 131 of the ball thread, which engages with the female ball thread (nut) 121. On the other hand, another portion of the output shaft 130 provides a rotation-restraint rectilinear motion guide, more particularly, a shaft side portion (spline shaft) 132 of a ball spline, which engages with a female bearing (boss member) 133 of the ball spline to form a rectilinear motion guide. The output shaft 130 and the rotors 107 and 117 have their rotational axes disposed in a coaxial relationship. The movable portion of the left-side ultrasonic motor, that is, the rotor 117 is fixed to the female bearing 133 of the ball spline by another keeping ring 140. The stationary ring 105 supports the female bearing 133 of the ball spline with respect to the rotational direction by using rotary bearings 135 and 136, and the second housing 150 supports the female bearing 133 with respect to the axial direction by using a thrust bearing 137, a keeper ring 138 and a double nut 139. The second housing 150 is securely fixed to the stationary ring 105. By rotating the keeper ring 138 to adjust the position of the female bearing 133 of the ball spring suitably, under the influence of the thin plate-like portion 119 of the rotor 117 a suitable urging pressure can be applied to between the friction surface 118 of the rotor 117 and the oscillation surface 113 of the stator 111. During the non-energization period, each of the left-side and right-side ultrasonic motors are rotation-restrained by this urging pressure.

This is the basic structure of the present embodiment. The remaining part of this embodiment is essentially the same as the corresponding parts of the preceding embodiments. When in operation only the right-side ultrasonic motor operates, the nut 121 side of the ball thread rotates while, on the other hand, the output shaft 130 moves only axially because the rotation is restrained by the constraining force of the left-side ultrasonic motor. Here, if the right-side ultrasonic motor has a positioning angular resolution of 15 sec. as described and the ball thread has a lead of 2 mm, in regard to the axial feeding, a very high positioning resolution of 0.023 micron (0.011 micron if the lead is 1 mm) is attainable.

In FIG. 5, the axial stroke of the output shaft is ±s and, in practical dimension, s=5 mm is set. However, it will be readily understood that a longer stroke or a shorter stroke can be set as desired by appropriately setting the position of each of the female ball spline 133 and the female ball thread 121 as well as the length and the position of each of the spline shaft portion 132 and the ball thread shaft portion 131 of the output shaft.

The manner of rotary drive will be explained. In FIG. 5, the output shaft 130 engages with the ball spline 133, and the ball spline 133 is directly coupled to the rotor 117 of the left-side ultrasonic motor. Therefore, the rotational angle of the rotor 117 of the left-side ultrasonic motor directly corresponds to the rotational angle of the output shaft 130. Since, however, the output shaft 130 also engages with the female portion 121 of the ball thread, even if only the left-side ultrasonic motor operates, the output shaft 130 also moves axially while being rotated.

Figure 7:
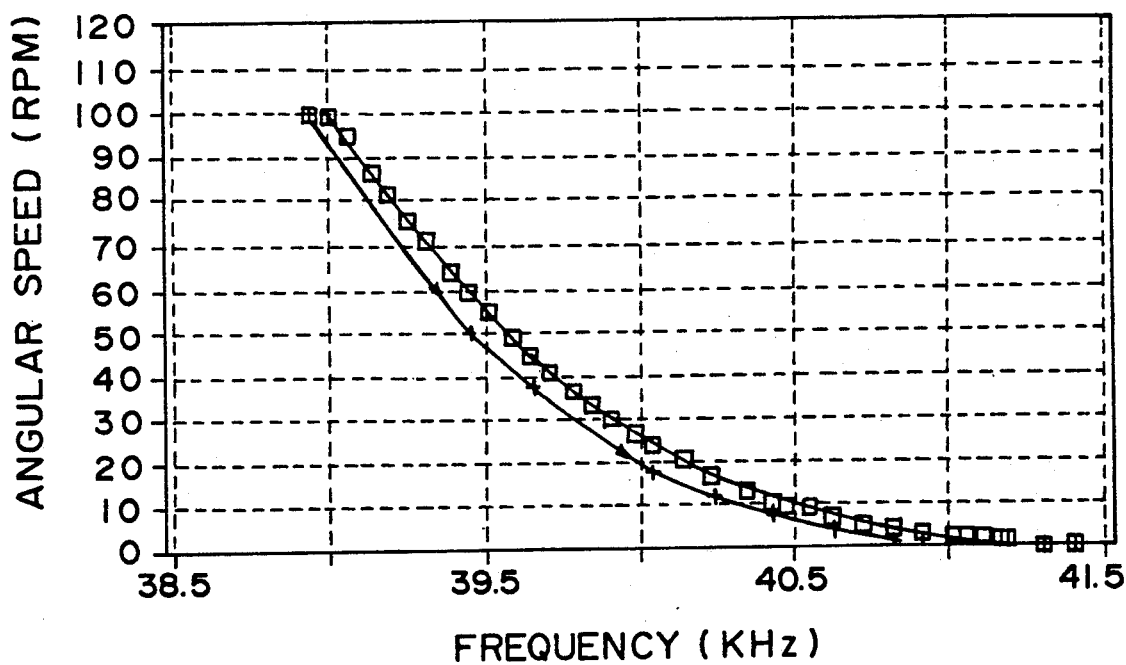
FIG. 7 is a graph, showing the applied frequency versus angular speed characteristic of a ultrasonic motor.

In order to ensure that the output shaft 130 moves only in the rotational direction, as a matter of course, both the left-side and the right-side ultrasonic motors are rotated at the same speed and in the same direction. Here, the expected positioning angular resolution is about 15 sec. as described. This is the basic structure and the basic operation of an embodiment of a rectilinear-motion and rotary-motion double-axis actuator.

Where the actuator of FIG. 5 is used simply as a rectilinear-motion actuator, rather than a rectilinear-motion and rotary-motion double-axis actuator, it can be used as a speed-controllable actuator of double-speed/ultra-low-sped type, having a large dynamic range. As described hereinbefore, if both the left-side and the right-side ultrasonic motors are rotated at the same speed and in the same direction, no axial movement is produced. Accordingly, if a very small seed difference is provided, it is possible to ensure axial movement at an ultra-low speed. Also, if the left-side and the right-side ultrasonic motors are rotated at the same speed but in the opposite directions, the axial movement at the double speed is assured. Since the ultrasonic motor itself has a wide dynamic range, as illustrated in FIG. 7, it is possible to cover a wide speed range. Additionally, when the stoppage from the ultra-low speed movement is taken into account, further improvement in the positioning resolution is expected.

It is to be noted here that the present invention is not limited to a component type actuator. Where the invention is applied to a built-in type actuator to be directly built in an instrument, it is possible to realize a lightweight and high-precision drive mechanism.

While the invention has been described with reference to the structures disclosed herein, it is not confined to the details set forth and this application is intended to cover such modifications or changes as may come within the purposes of the improvements or the scope of the following claims.

What is claimed is:

1. A precision actuator, comprising:
   a housing;
   an ultrasonic motor disposed in said housing and having a ring-like rotor and a stator;
   an output shaft;
   rotation-restraint rectilinear motion guide means for coupling said output shaft to said housing, slidably in an axial direction but unrotatably relative to it; and
   screw means for coupling said output shaft to said rotor.

2. An actuator according to claim 1, wherein said output shaft is provided coaxially with a rotational shaft of said ultrasonic motor.

3. An actuator according to claim 2, wherein said guide mean includes a spline mechanism having a spline shaft and a boss member, said spline shaft being integral with and coaxial with said output shaft, and said boss member being fixed to said housing.

4. An actuator according to claim 3, further comprising spring means for urging said output shaft in the axial direction.

5. An actuator according to claim 4, wherein said screw means includes a feed screw integral with and coaxial with said output shaft, and a nut rotatably mounted to said housing.

6. An actuator according to claim 5, wherein said rotor is coupled to said nut through said spring means.

7. An actuator according to claim 1, further comprising angle detecting means for detecting rotation of said output shaft.

8. An actuator according to claim 1, further comprising position detecting means for detecting axial movement of said output shaft.

9. A precision actuator, comprising:
   a housing;
   a stationary member provided in said
   an output shaft;
   a first ultrasonic motor mounted to said stationary member;
   a second ultrasonic motor mounted to said stationary member in a coaxial relationship with said first ultrasonic motor;
   rotation-restraint rectilinear motion guide means for coupling said output shaft to said first ultrasonic motor, slidably in an axial direction but unrotatably relative to it; and
   screw means for coupling said output shaft to said second ultrasonic motor.

10. An actuator according to claim 9, wherein said output shaft is coaxial with rotational shafts of said first and second ultrasonic motors.

11. An actuator according to claim 10, wherein said first ultrasonic motor has a rotor and a stator, one of which is secured to said stationary member and the other of which is secured to said guide means.

12. An actuator according to claim 11, wherein said guide means includes a spline mechanism having a spline shaft and a boss member, said spline shaft being coaxial with said output shaft, said boss member being rotatably mounted to said stationary member and being secured to one of said rotor and said stator.

13. An actuator according to claim 10, wherein said second ultrasonic motor has a rotor and a stator, one of which is secured to said stationary member and the other of which is secured to said screw means.

14. An actuator according to claim 13, wherein said screw means includes a thread screw member coaxial with said output shaft and a nut member rotatably mounted to said stationary member, and wherein one of said rotor and said stator is fixed to said nut member.

* * * * *

UNITED STATES PATENT AND TRADEMARK OFFICE
CERTIFICATE OF CORRECTION

PATENT NO. : 5,053,670
DATED : October 1, 1991
INVENTOR(S) : Masao Kosugi

It is certified that error appears in the above-identified patent and that said Letters Patent is hereby corrected as shown below:

Title page, item [30],

FOREIGN APPLICATION PRIORITY DATA:

"Nov. 20, 1989 [JP] Japan ............. 1-299581"
(second occurrence) should be deleted.

COLUMN 8:

Line 33, "said" should read --said housing;--.

Signed and Sealed this

Eighth Day of June, 1993

Attest:

MICHAEL K. KIRK

Attesting Officer     Acting Commissioner of Patents and Trademarks